US008275600B2

(12) United States Patent
Bilac et al.

(10) Patent No.: US 8,275,600 B2
(45) Date of Patent: Sep. 25, 2012

(54) MACHINE LEARNING FOR TRANSLITERATION

(75) Inventors: Slaven Bilac, Tokyo (JP); Hiroshi Ichikawa, Tokyo (JP)

(73) Assignee: Google Inc., Mountain View, CA (US)

( * ) Notice: Subject to any disclaimer, the term of this patent is extended or adjusted under 35 U.S.C. 154(b) by 890 days.

(21) Appl. No.: 12/357,269

(22) Filed: Jan. 21, 2009

(65) Prior Publication Data

US 2010/0094614 A1 Apr. 15, 2010

Related U.S. Application Data

(60) Provisional application No. 61/104,692, filed on Oct. 10, 2008.

(51) Int. Cl.
*G06F 17/28* (2006.01)

(52) U.S. Cl. ......................... 704/2; 704/5; 704/8; 704/9

(58) Field of Classification Search ........................ None
See application file for complete search history.

(56) References Cited

U.S. PATENT DOCUMENTS

| | | | | |
|---|---|---|---|---|
| 7,983,903 | B2 * | 7/2011 | Gao | 704/10 |
| 2001/0029455 | A1 * | 10/2001 | Chin et al. | 704/277 |
| 2005/0216253 | A1 * | 9/2005 | Brockett | 704/5 |
| 2007/0022134 | A1 * | 1/2007 | Zhou et al. | 707/102 |
| 2007/0124133 | A1 * | 5/2007 | Wang et al. | 704/10 |
| 2009/0070095 | A1 * | 3/2009 | Gao | 704/2 |
| 2009/0222437 | A1 * | 9/2009 | Niu et al. | 707/5 |

OTHER PUBLICATIONS

Korean Examiner Byung Il An, Notification of Transmittal of the International Search Report and the Written Opinion of the International Searching Authority for Application No. PCT/US2009/059576, dated May 3, 2010, 10 pages.
K. Saravannan et al., "Some Experiments in Mining Named Entity Transliteration Pairs from Comparable Corpora", The 2nd International Workshop on "Cross Lingual Information Access" Addressing the Information Need of Multilingual Societies, 2008, pp. 26-33.
Jian-Cheng Wu et al., "Learning to Find English to Chinese Transliteration on the Web", Proceedings of the 2007 Joint Conference on Empirical Methods in Natural Language Processing and Computational Natural Language Learning, Prague, Jun. 2007, pp. 996-1004.
Bilac, S., et al., "Direct Combination of Spelling and Pronunciation Information for Robust Back-Transliteration", Tokyo Institute of Technology, 2005, 12 pages.
Klementiev, A., et al., "Weakly Supervised Named Entity Transliteration and Discovery from Multilingual Comparable Corpora", Proceedings of the 21st International Conference on Computational Linguistics and 44th Annual Meeting of the ACL, 2006, 8 pages.
Knight, K., et al., "Machine Transliteration", Computational Linguistics, 1998, 14 pages.

* cited by examiner

*Primary Examiner* — Leonard Saint Cyr
(74) *Attorney, Agent, or Firm* — Harness, Dickey & Pierce, P.L.C.

(57) ABSTRACT

Methods, systems, and apparatus, including computer program products, for automatically identifying transliteration pairs are disclosed. In one implementation, a method is provided. The method includes receiving a plurality of resources, the plurality of resources including a plurality of anchor text; determining one or more potential transliterations from the plurality of anchor text; and identifying one or more potential transliteration pairs from the one or more potential transliterations, where each potential transliteration pair includes a first anchor text in a first writing system and a second anchor text in a second writing system, the second anchor text and the first anchor text identifying a same resource or location.

22 Claims, 5 Drawing Sheets saxophone
サクソフォン saxophone
サキソフォン saxophone
サキソフォーン

FIG. 1

MACHINE LEARNING FOR TRANSLITERATION

CROSS-REFERENCE TO RELATED APPLICATIONS

This application claims priority to U.S. Provisional Application Ser. No. 61/104,692, for "Machine Learning for Transliteration," filed on Oct. 10, 2008, which is incorporated by reference herein in its entirety.

BACKGROUND

This specification relates to transliteration.

Electronic documents are typically written in many different languages. Each language is normally expressed in a particular writing system (e.g., a script), which is usually characterized by a particular alphabet. For example, the English language can be expressed using Latin characters while the Japanese language can be expressed using Katakana characters. The scripts used by some languages include a particular alphabet that has been extended to include additional marks or characters. In transliteration, a first writing system is used to represent words normally represented by a second writing system. For example, a transliterated term can be a term that has been converted from one script to another script or a phonetic representation in one script of a term in another script. Transliterations can differ from translations because the meanings of terms are not reflected in the transliterated terms.

Techniques for extracting transliterations pairs may require annotated training data or language specific data. For example, conventional techniques for transliteration use rules, which specify that one or more particular characters in a first script can be mapped to one or more particular characters in a second script. These rules are typically language specific and may require annotated training data and/or parallel training data (e.g., comparable training data in the first and second scripts).

SUMMARY

This specification describes technologies relating to machine learning for transliteration.

In general, one aspect of the subject matter described in this specification can be embodied in methods that include the actions of receiving a plurality of resources. The plurality of resources can include a plurality of anchor text. One or more potential transliterations can be determined from the plurality of anchor text. The one or more potential transliterations can be sorted, based on likelihoods of the one or more potential transliterations co-occurring with text that identifies a same resource or location. One or more potential transliteration pairs can be identified from the one or more potential transliterations. Each potential transliteration pair can include a first anchor text in a first writing system and a second anchor text in a second writing system. The second anchor text and the first anchor text can identify a same resource or location. For each potential transliteration pair, the first anchor text and the second anchor text can be compared; and the potential transliteration pair can be first classified as being a transliteration pair or not being a transliteration pair, based on the comparison.

The first classified potential transliteration pairs can be first sorted, based on likelihoods of the first classified potential transliteration pairs being transliteration pairs, to produce first sorted potential transliteration pairs. A subset of the first sorted potential transliteration pairs can be identified. The subset can include potential transliteration pairs classified as being transliteration pairs and potential transliteration pairs classified as not being transliteration pairs.

For each potential transliteration pair in the subset, the first anchor text and the second anchor text can be aligned; and one or more edits from the alignment can be extracted. A classification model can be generated, based on the one or more edits and the subset. Each of the first classified potential transliteration pairs can be second classified as being a transliteration pair or not being a transliteration pair, using the classification model. Other embodiments of this aspect include corresponding systems, apparatus, and computer program products.

These and other embodiments can optionally include one or more of the following features. Comparing the first anchor text and the second anchor text can include determining a first edit distance between the first anchor text and the second anchor text, and comparing the first edit distance to a first threshold value. The aligning can be based on minimizing the first edit distance. The first threshold value can be the lesser of a length of the first anchor text and a length of the second anchor text. The potential transliteration pair can be first classified as not being a transliteration pair when the first edit distance is greater than the first threshold value, and the potential transliteration pair can be first classified as being a transliteration pair when the first edit distance is less than the first threshold value.

Generating the classification model can include associating each of the one or more edits to a feature, and generating a feature weight for each feature. The second classifying can include: for each of the first classified potential transliteration pairs, comparing the first classified potential transliteration pair to the one or more features in the classification model; determining one or more feature weights, based on the comparison; and summing the one or more feature weights to produce a classification score.

The method can further include for the one or more edits associated with the first writing system, second sorting the second classified potential transliteration pairs, based on likelihoods of the second classified potential transliteration pairs being transliteration pairs; and for each second sorted potential transliteration pair, reclassifying the second sorted potential transliteration pair as not being a transliteration pair when its corresponding classification score indicates that the second sorted potential transliteration pair is not a transliteration pair; reclassifying the second sorted potential transliteration pair as a best potential transliteration pair when the second sorted potential transliteration pair has the highest likelihood of being a transliteration pair and its corresponding classification score indicates that the second sorted potential transliteration pair is a transliteration pair; determining a second edit distance between the second sorted potential transliteration pair and the best potential transliteration pair; reclassifying the second sorted potential transliteration pair as being a transliteration pair when its second edit distance is less than a second threshold value and its corresponding classification score indicates that the second sorted potential transliteration pair is a transliteration pair; and reclassifying the second sorted potential transliteration pair as not being a transliteration pair when its second edit distance is greater than the second threshold value.

The method can further include for the one or more edits associated with the second writing system, third sorting the reclassified potential transliteration pairs, based on likelihoods of the reclassified potential transliteration pairs being transliteration pairs; and for each third sorted potential transliteration pair classified as being a transliteration pair, reclassifying the third sorted potential transliteration pair as not being a transliteration pair when its corresponding classification score indicates that the third sorted potential transliteration pair is not a transliteration pair; reclassifying the third sorted potential transliteration pair as a best potential transliteration pair when the third sorted potential transliteration pair has the highest likelihood of being a transliteration pair and its corresponding classification score indicates that the third sorted potential transliteration pair is a transliteration pair; determining a third edit distance between the third sorted potential transliteration pair and the best potential transliteration pair; reclassifying the third sorted potential transliteration pair as being a transliteration pair when its third edit distance is less than a third threshold value and its corresponding classification score indicates that the third sorted potential transliteration pair is a transliteration pair; and reclassifying the third sorted potential transliteration pair as not being a transliteration pair when its third edit distance is greater than the third threshold value.

The classification model can use a support vector machine (SVM). The likelihoods can be calculated using log-likelihood ratios.

In general, another aspect of the subject matter described in this specification can be embodied in methods that include the actions of receiving a plurality of resources. The plurality of resources can include a plurality of anchor text. One or more potential transliterations can be determined from the plurality of anchor text. One or more potential transliteration pairs can be identified from the one or more potential transliterations. Each potential transliteration pair can include a first anchor text in a first writing system and a second anchor text in a second writing system. The second anchor text and the first anchor text can identify a same resource or location.

For each potential transliteration pair, the potential transliteration pair can be classified as being a transliteration pair or not being a transliteration pair; the first anchor text can be aligned with the second anchor text. One or more edits can be extracted from the alignment. A classification model can be generated, based on the one or more edits and a subset of the classified potential transliteration pairs. Other embodiments of this aspect include corresponding systems, apparatus, and computer program products.

These and other embodiments can optionally include one or more of the following features. The method can further include identifying transliteration pairs from the potential transliteration pairs, using the classification model. The one or more potential transliteration pairs can be identified from the one or more potential transliterations, based on likelihoods of the one or more potential transliterations co occurring with text that identifies a same resource or location. The classifying can include determining a first edit distance between the first anchor text and the second anchor text; comparing the first edit distance to a first threshold value; and classifying the potential transliteration pair as being a transliteration pair or not being a transliteration pair, based on the comparison. The aligning can be based on minimizing the first edit distance. The first threshold value can be the lesser of a length of the first anchor text and a length of the second anchor text.

The method can further include reclassifying the potential transliteration pairs based on refinement rules and the one or more edits in the first writing system. The method can also include reclassifying the potential transliteration pairs classified as being a transliteration pair based on the refinement rules and the one or more edits in the second writing system. The method can further include sorting the classified potential transliteration pairs based on likelihoods of the classified potential transliteration pairs being transliteration pairs. The subset can include potential transliteration pairs classified as being a transliteration pair and potential transliteration pairs classified as not being a transliteration pair. The classification model can use a support vector machine (SVM).

Particular embodiments of the subject matter described in this specification can be implemented to realize one or more of the following advantages. Automatically identifying transliteration pairs using anchor text increases the flexibility and coverage of identification by: (i) reducing or eliminating the use of annotated training data, and (ii) reducing or eliminating the use of language specific rules or data (e.g., parallel training data). As a result, the number of identified transliteration pairs (e.g., in a dictionary) can be increased, thereby increasing the precision, recall, and accuracy of identifying transliteration pairs in input text.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIG. 1 shows example transliteration pairs.

Like reference symbols and designations in the various drawings indicate like elements.

DETAILED DESCRIPTION

FIG. 1 shows example transliteration pairs. A transliteration pair can include, for example, a first word represented in a first writing system and a second word represented in a second writing system. The first writing system and second writing system can be used to express a same language or different languages. For example, the first and second writing systems can be Katakana and Kanji, which are writing systems used to express the Japanese language. As another example, the first and second writing systems can be Latin and Kanji, which are used to express different languages. In addition, each transliteration in a transliteration pair can include text of any length, e.g., a transliteration can be a single character or a phrase.

Transliterations can have a plurality of variants. In other words, there can be multiple representations in a first writing system for transliterations of a word represented in a second writing system. For example, FIG. 1 includes three Katakana transliterations サクソフォン, サキソフォン, and サキソフォーン for the Latin representation of the English word "saxophone".

The use of annotated training data or language specific rules can limit the amount of training data that can be used to train a classification model (e.g., using a classifier), for example, for identifying transliteration pairs. As a result, the likelihood that all variants of a transliteration are identified may be reduced. However, using anchor text to train a classification model can increase the amount of usable training data (e.g., any resource that includes anchor text can be used), thereby increasing the likelihood that all variants of a transliteration are learned by the classifier.

Figure 2:
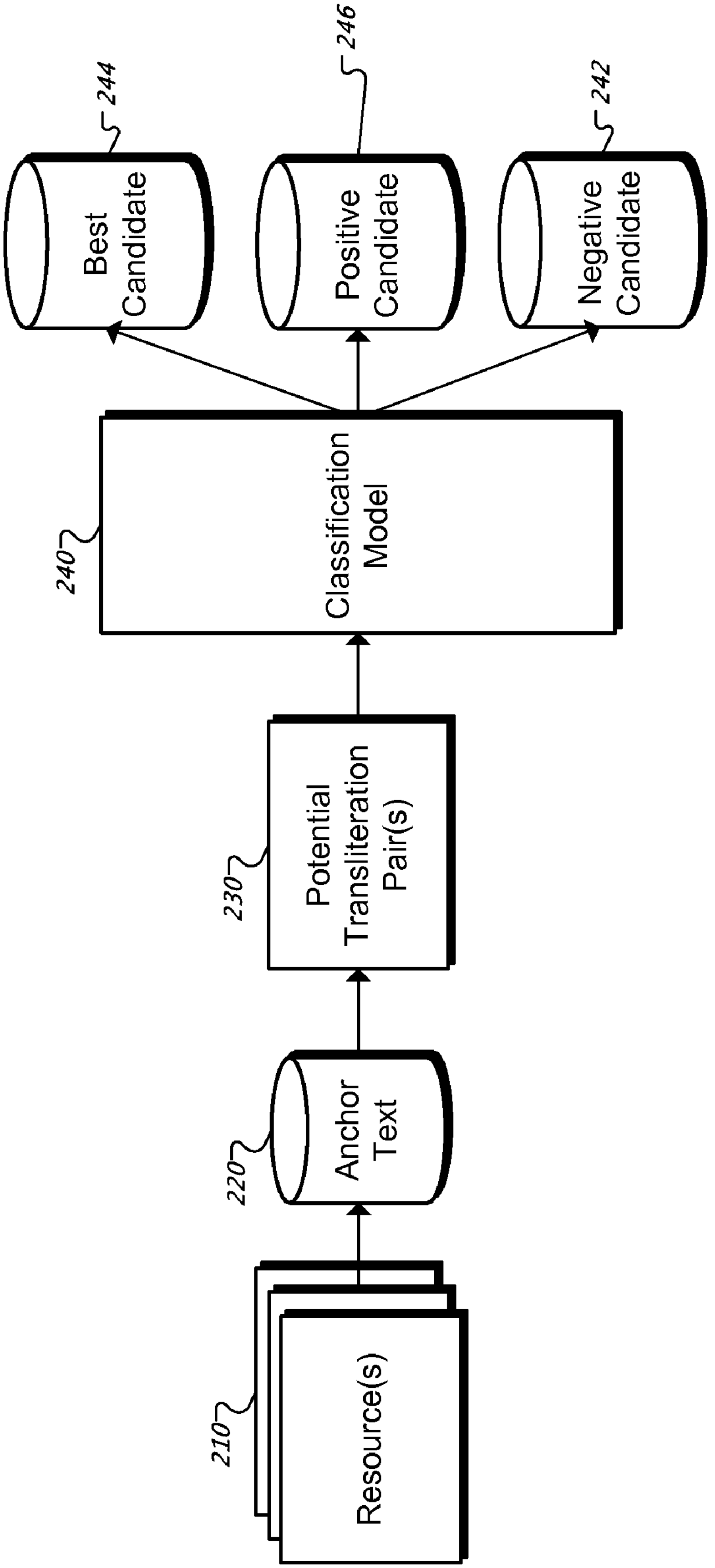
FIG. 2 is a block diagram illustrating an example automatic identification of transliteration pairs using anchor text.

FIG. 2 is a block diagram illustrating an example automatic identification of transliteration pairs using anchor text. FIG. 2 includes one or more resources 210. The one or more resources 210 can be, for example, web pages, spreadsheets, emails, blogs, and instant message (IM) scripts. The one or more resources 210 can include anchor text.

Anchor text is text that links to a resource (e.g., a web page) identified by a Uniform Resource Locator (URL), for example. In some implementations, anchor text can link to a particular location in a resource (e.g., a location on a web page). Anchor text can provide contextual information related to the resource. In some implementations, anchor text may be related to actual text of an associated URL. For example, a hyperlink to the Google™ web site can be represented as:

<a href="http://www.google.com">Google</a>.

In this example, the hyperlink displays in a web page as Google.

In some implementations, the anchor text may not be related to the actual text of the associated URL. For example, a hyperlink to the Google™ web site can be represented as:

<a href="http://www.google.com">search engine</a>.

In this example, the hyperlink displays in a web page as search engine.

Because anchor text can provide contextual information related to the resource, different anchor text that identify a same resource can be used as unannotated training data for identifying transliteration pairs. Although, "search engine" is not a transliteration for "Google", other examples of anchor text may provide the same contextual information as transliterations.

For example, another hyperlink to the Google™ web site can be represented as:

<a href="http://www.google.com"谷歌</a>.

In this example, the hyperlink displays in a web page as 谷歌. 谷歌is the transliteration for "Google" in Chinese.

As another example, a web page can include anchor text パーソナルケア(a Katakana transliteration of "personal care"), and an English website can include anchor text personal care that both link to a same web page (e.g., a web page about personal health).

Returning to FIG. 2, anchor text 220 from the resources 210 can be extracted. As illustrated in the previous examples relating to anchor text that linked to the Google™ web site, extracted samples of anchor text can be in the same writing system, and therefore, cannot be transliteration pairs. Furthermore, extracted samples of anchor text that do not link to a same resource or location are less likely to be related contextual information than samples that do link to a same resource or location. In particular, these extracted samples of anchor text are not likely to be the same contextual information. Therefore, potential transliteration pairs 230 (e.g., transliteration pair candidates) can be determined by identifying samples of anchor text that are represented in different writing systems and link to a same resource or location. Each potential transliteration pair comprises a first anchor text in a first writing system and a second anchor text in a second writing system.

During the extraction of anchor text 220 from the resources 210, various statistics related to the extracted anchor text can be collected. For example, the frequency (e.g., a count) of text, that is the same as the anchor text but does not link to a resource or a location (e.g., plain text that is not associated with a URL), in the resources can be determined. The frequency of the anchor text occurring in more than one writing system and linking to a same resource or location (e.g., occurring as a potential transliteration pair) can also be determined. Furthermore, the frequency of the anchor text occurring only in a single writing system can be determined.

One or more potential transliterations from the plurality of anchor text can be determined. One or more of these frequencies can be used to calculate a likelihood that a potential transliteration co-occurs with text that identifies a same resource or location. In some implementations, a likelihood of co-occurrence can be calculated by using a log-likelihood ratio. Other statistics related to the occurrences of the anchor text can also be collected and used to calculate the likelihood that a potential transliteration pair is a transliteration pair. Potential transliteration pairs can be identified from the one or more potential transliterations. The one or more potential transliterations can be sorted, based on likelihoods of the one or more potential transliterations co-occurring with text that identifies a same resource or location. Using this likelihood determination, a system can identify potential transliteration pairs in training data in any language or writing system, e.g., the system can be language/writing system-independent.

After identifying potential transliteration pairs 220, each potential transliteration pair can be scored. In particular, a classification model 240 can be generated, using a classifier (e.g., a linear support vector machine (SVM)). The classification model 240 can be used to score each potential transliteration pair, as described in more detail below. As an overview, the classification model 240 can include features of transliteration pairs and a corresponding feature weight for each feature. The features can be matched to a potential transliteration pair, and the corresponding feature weights can be summed to produce a classification score for the potential transliteration pair.

Each potential transliteration pair is initially classified as being a transliteration pair or not being a transliteration pair. In some implementations, each potential transliteration pair is initially classified based on an edit distance between the first anchor text and the second anchor text. The edit distance can be defined, for example, as the number of operations that are used to transform the first anchor text into the second anchor text.

Figure 3:
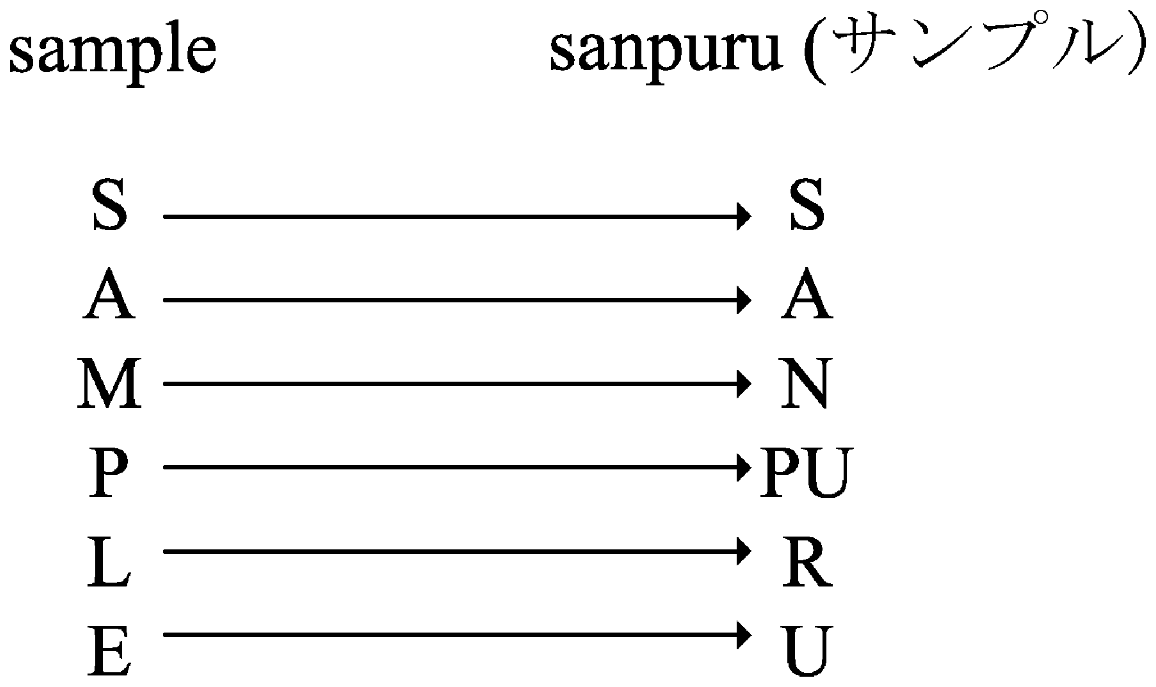
FIG. 3 includes an example potential transliteration pair and its corresponding edits.

Temporarily referring to FIG. 3, an example potential transliteration pair and its corresponding edits are shown. The transliteration pair comprises a first anchor text in a first writing system (e.g., "sample") and a second anchor text in a second writing system (e.g., サンプル).The first anchor text and the second anchor text can be processed before an edit distance is determined. In some implementations, the first anchor text and second anchor text are transformed into a common writing system. For example, サンプルcan be transformed into "sanpuru" (e.g., a phonetic spelling), so that the first anchor text and the transformed second anchor text both comprise Latin characters. In some implementations, both the first anchor text and the transformed second anchor text are normalized. For example, "sample" and "sanpuru" can be capitalized to produce "SAMPLE" and "SANPURU". This normalization can be used to facilitate alignment of the first anchor text and the transformed second anchor text.

After being processed, the first anchor text and transformed second anchor text can be aligned to determine an edit distance and one or more edits from each of the first anchor text and the transformed second anchor text. During alignment, characters from the first anchor text can be matched with characters from the transformed second anchor text. In some implementations, characters can be matched based on the statistical likelihood that one or more characters in the first anchor text co-occur with one or more characters in the second anchor text. For example, co-occurrence probabilities can be measured by Dice coefficients. In some implementations, consonant maps can be used to further refine the alignment process.

In some implementations, the alignment can be performed, such that the edit distance is minimized. Returning to FIG. 3, the characters of "SAMPLE" are matched with the characters of "SANPURU" in six operations. In particular, the operations include: (1) matching "S" with "S", (2) matching "A" with "A", (3) matching "M" with "N", (4) matching "P" with "PU", (5) matching "L" with "R", and (6) matching "E" with "U". Because six operations are used to align the first anchor text with transformed second anchor text, the edit distance is six. In some implementations, an unweighted edit distance is minimized. In some implementations, the edit distance can be weighted, and the weighted edit distance is minimized. Other implementations are possible.

In this example alignment, six edits for each of the first anchor text and the transformed second anchor text are identified. The edits associated with Latin can be represented as features "S_S", "A_A", "M_N", "P_PU", "L_R", and "E_U". The underscore between the letters can be used to distinguish the character from the first anchor text from the character from the transformed second anchor text. The edits associated with Katakana can be represented as features "S_S", "A_A", "N_M", "PU_P", "R_L", and "U_E". Each edit can be associated to a feature in the classification model 240. For example, "P_PU" can be a feature of the potential transliteration pair associated with Latin. Alternatively, "PU_P" can be a feature of the potential transliteration pair associated with Katakana.

In some implementations, the features corresponding to the beginning or end of anchor text in a potential transliteration pair can be indicated as a feature for the beginning of anchor text in a potential transliteration pair, and a feature for the ending of anchor text in a potential transliteration pair, respectively. For example, the feature "S_S" can be represented as "^S_^S", where the prefix "^" indicates that this feature represents characters that occur at the beginning of anchor text in a potential transliteration pair. In addition, the feature "E_U" can be represented as "E$_U$", where the suffix "$" indicates that this feature represents characters that occur at the end of anchor text in a potential transliteration pair.

These indications can be used during comparisons of potential candidate pairs to the features, so that the beginning and ending of the potential candidate pairs are only compared to the appropriate features (e.g., beginning and ending features, respectively). As a result, the appropriate feature weights can be used to calculate the classification score. Other implementations are possible. For example, different characters (e.g., delimiters) can be used as separators, prefixes, or suffixes.

In some implementations, the alignment is performed so that there are no empty edits. After an initial alignment, adjacent edits can be grouped together so that there are no edits with an empty side. As an example, a first anchor text "TOP" can be aligned with a second transformed anchor text "TOPPU" (トップ). Initially, alignment may produce the following features "T_T", "O_O", "P_P", "<null>_P", and "<null>_U", where <null> represents an empty edit. The alignment can be performed, such that the adjacent features "<null>_P" and "<null>_U" are combined to produce "<null>_PU", and then "P_P" and "<null>_PU" are combined to produce "P_PPU". As a result, the final alignment produces the features "T_T", "O_O", and "P_PPU".

During alignment, statistics can be collected that can be used to calculate the likelihood that a potential transliteration pair is a transliteration pair. For example, a count of the number of consonants in each of the first anchor text and the transformed second anchor text can be determined. A count of the number of vowels in each of the first anchor text and the transformed second anchor text can also be determined. The difference between the counts can be calculated. The differences between the first anchor text and the second transformed anchor can be used to calculate the likelihood that the potential transliteration pair is a transliteration pair.

After determining the edit distance for the potential transliteration pair, the edit distance is compared to a threshold value. In some implementations, the threshold value is the lesser of a length of the first anchor text and a length of the second anchor text. If the edit distance is greater than the threshold value, then the potential transliteration pair can be classified as not being a transliteration pair. Otherwise, the potential transliteration can be classified as being a transliteration pair. Returning to the example in FIG. 3, the edit distance is six, and the lengths of "SAMPLE" and "SANPURU" are six and seven respectively. Therefore, the threshold value is six, and "sample" and サンプル can be initially classified as being a transliteration pair. Other implementations are possible. For example, the initial classification can be based on any of the statistics determined during alignment. As another example, the potential transliteration pair can be classified as not being a transliteration pair if the edit distance is less than the threshold value.

In some implementations, after all of the potential transliteration pairs are initially classified as either being or not being a transliteration pair, the potential transliteration pairs are sorted. The potential transliteration pairs can be sorted according to their likelihoods of being a transliteration pair. For example, a log-likelihood ratio of each potential transliteration pair being a transliteration pair can be calculated, e.g., using the statistics (e.g., frequencies and counts) acquired during extraction and alignment. A subset of the sorted potential transliteration pairs can be used to generate (e.g., train) the classification model 240. For example, the potential transliteration pairs that are most likely to be transliteration pairs (e.g., top 1%) and were initially classified as being transliteration pairs, can be extracted. These pairs can be used to represent samples of transliteration pairs. In addition, the potential transliteration pairs that are least likely to be transliteration pairs (e.g., bottom 1%) and were initially classified as not being transliteration pairs, can be extracted. These pairs can be used to represent samples that are not transliteration pairs. These samples can be used to train the classification model 240.

The samples of transliteration pairs, the samples that are not transliteration pairs, and the features can be used to generate the classification model 240, e.g., generate a feature weight for each of the features. In some implementations, a simple linear SVM can be trained using this data. In particular, the samples of transliteration pairs can be used as data points for a first class, e.g., a class of data points that are transliteration pairs. The samples that are not transliteration pairs can be used as data points for a second class, e.g., a class of data points that are not transliteration pairs. A hyperplane (e.g., a maximum-margin hyperplane) can be determined that separates the data points into their respective classes, and maximizes the distance from the hyperplane to the nearest data point. Other implementations are possible. For example, the data can be used to train generative models, using linear discriminant analysis or a naïve Bayes classifier; or discriminative models, using logistic regression or perception.

A feature weight for each feature can be calculated based on samples that include the feature. For example, a feature weight can be increased for a feature that is included in a sample in the first class. As another example, a feature weight can be decreased for a feature that is included in a sample in the second class. If the feature appears in samples in both the first and the second class, a neutral feature weight (e.g., zero) can be assigned. Using this example convention, a higher classification score can represent a better potential transliteration pair (e.g., a better transliteration pair candidate).

Feature weights that correspond to features in a potential transliteration pair can be summed to produce a classification score for the potential transliteration pair. Based on the classification score, the potential transliteration pairs that were originally extracted from the anchor text can be classified as either being or not being a transliteration pair. Using the example convention described previously, if the classification score is negative, for example, the potential transliteration pair can be classified as not being a transliteration pair. If the classification score is positive, for example, the potential transliteration pair can be classified as being a transliteration pair. A classification score of zero can represent a neutral classification.

Returning to the example in FIG. 3, the potential transliteration pair comprising “sample” and サンプルcan be compared to the features in the classification model, and the features “S_S”, “A_A”, “N_M”, “PU_P”, and “R_L” can be returned. The feature weights corresponding to the returned features can be summed to produce a classification score for the potential transliteration pair, and the classification score can be used to classify the potential transliteration In some implementations, further refinements can be performed to improve the accuracy and precision of the automatic identification of transliteration pairs. For example, the following refinement rules can be used. For the one or more edits associated with the first writing system (e.g., edits associated with the features “S_S”, “A_A”, “N_M”, “PU_P”, and “R_L”), the potential transliteration pairs can be sorted again based on the likelihood of the potential transliteration pairs being transliteration pairs, e.g., using the log-likelihood ratio. The potential transliteration pair can be reclassified as not being a transliteration pair (e.g., a negative candidate 242) if its corresponding classification score is negative. The potential transliteration pair can be reclassified as a best potential transliteration pair (e.g., a best candidate 244) when the potential transliteration pair has the highest likelihood of being a transliteration pair and its corresponding classification score is positive. A second edit distance can be determined between the potential transliteration pair and the best potential transliteration pair, and the potential transliteration pair can be reclassified as being a transliteration pair (e.g., a positive candidate 246) when its second edit distance is less than a second threshold value and its corresponding classification score is positive. The potential transliteration pair can be reclassified as not being a transliteration pair when its second edit distance is greater than the second threshold value.

In some implementations, the same refinement rules can also be performed for the one or more edits associated with the second writing system (e.g., edits associated with the features “S_S”, “A_A”, “N_M”, “PU_P”, “R_L”, and “U_E”). In these and other implementations, potential transliteration pairs that were previously reclassified as not being a transliteration pair in the previous refinement are not reclassified during this refinement. In some implementations, even further refinements to the classification model can be achieved through performing one or more iterations of the steps used to train the classification model 240, described previously.

After an initial classification model 240 (e.g., a pre-classification model) is generated, and refined in some implementations, the classification model 240 can be used to identify transliteration pairs in input text. In particular, input text can be compared to the features in the classification model 240, and transliteration pairs can be identified using the techniques described previously. In addition, upon generation of the classification model 240, a set of identified transliteration pairs, e.g., potential transliteration pairs classified as transliteration pairs, is generated.

Figure 4:
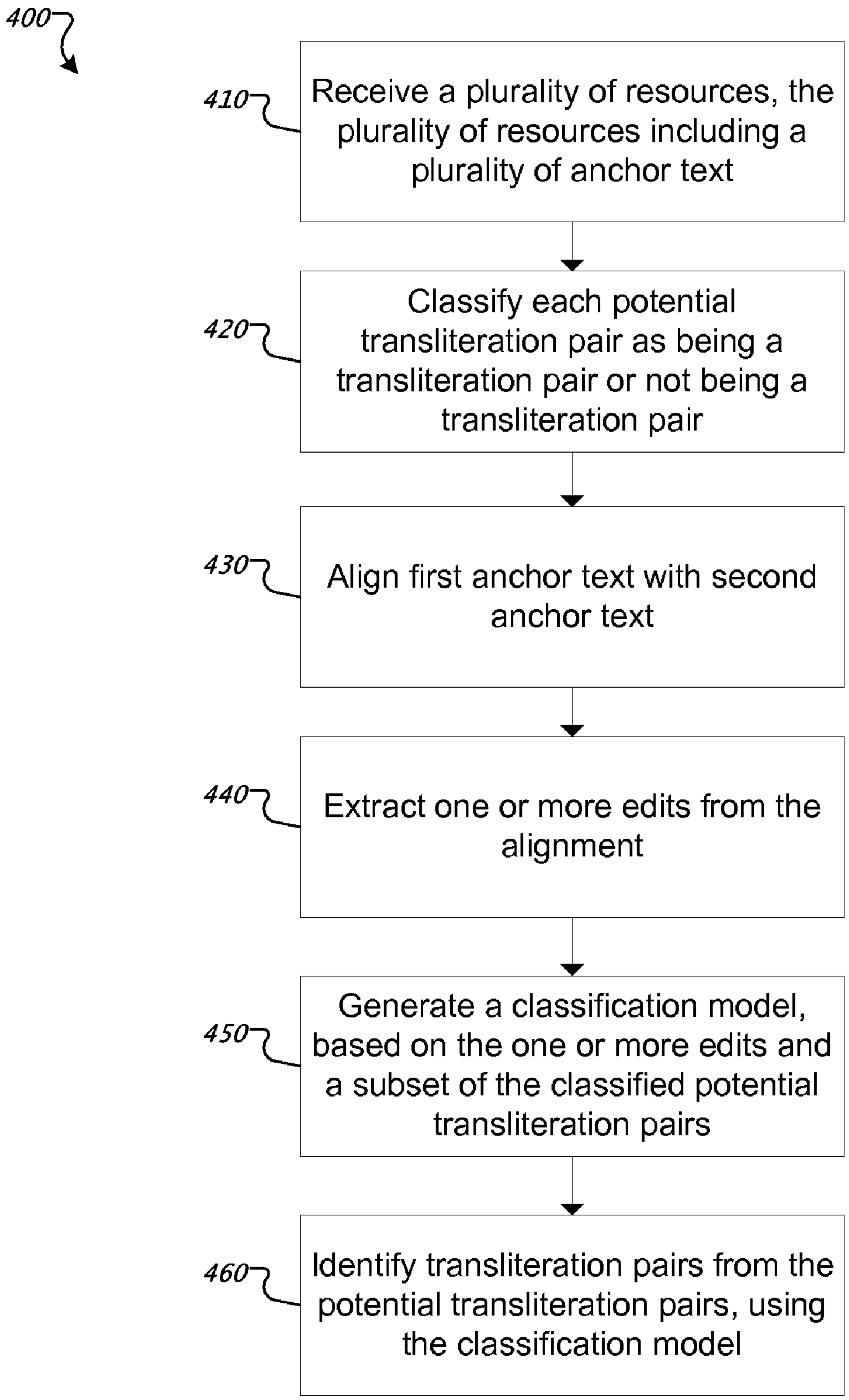
FIG. 4 is a flow chart showing an example process for automatically identifying transliteration pairs using anchor text.

FIG. 4 is a flow chart showing an example process 400 for automatically identifying transliteration pairs using anchor text. The method includes receiving 410 a plurality of resources, the plurality of resources including a plurality of anchor text. For example, the resources 210 that include anchor text 220 can be received by an extraction engine. In some implementations, one or more potential transliterations can be determined from the plurality of anchor text. The one or more potential transliterations can be sorted, based on likelihoods of the one or more potential transliterations co-occurring with text that identifies a same resource or location. One or more potential transliteration pairs can be identified from one or more potential transliterations. Each potential transliteration pair includes a first anchor text in a first writing system and a second anchor text in a second writing system, the second anchor text and the first anchor text identifying a same resource.

Each potential transliteration pair can be classified 420 as being a transliteration pair or not being a transliteration pair. For example, a classification engine can perform the classifying. The first anchor text can be aligned 430 with the second anchor text. For example, an alignment engine can perform the aligning. One or more edits can be extracted 440 from the alignment. For example, the extraction engine or the alignment engine can perform the extraction. A classification model can be generated 450, based on the one or more edits and a subset of the classified potential transliteration pairs. The subset can include potential transliteration pairs classified as being a transliteration pair and transliteration pairs classified as not being a transliteration pair. Transliteration pairs can be identified 460 from the potential transliteration pairs, using the classification model. For example, the classification engine can generate the classification model, and identify the transliteration pairs.

Figure 5:
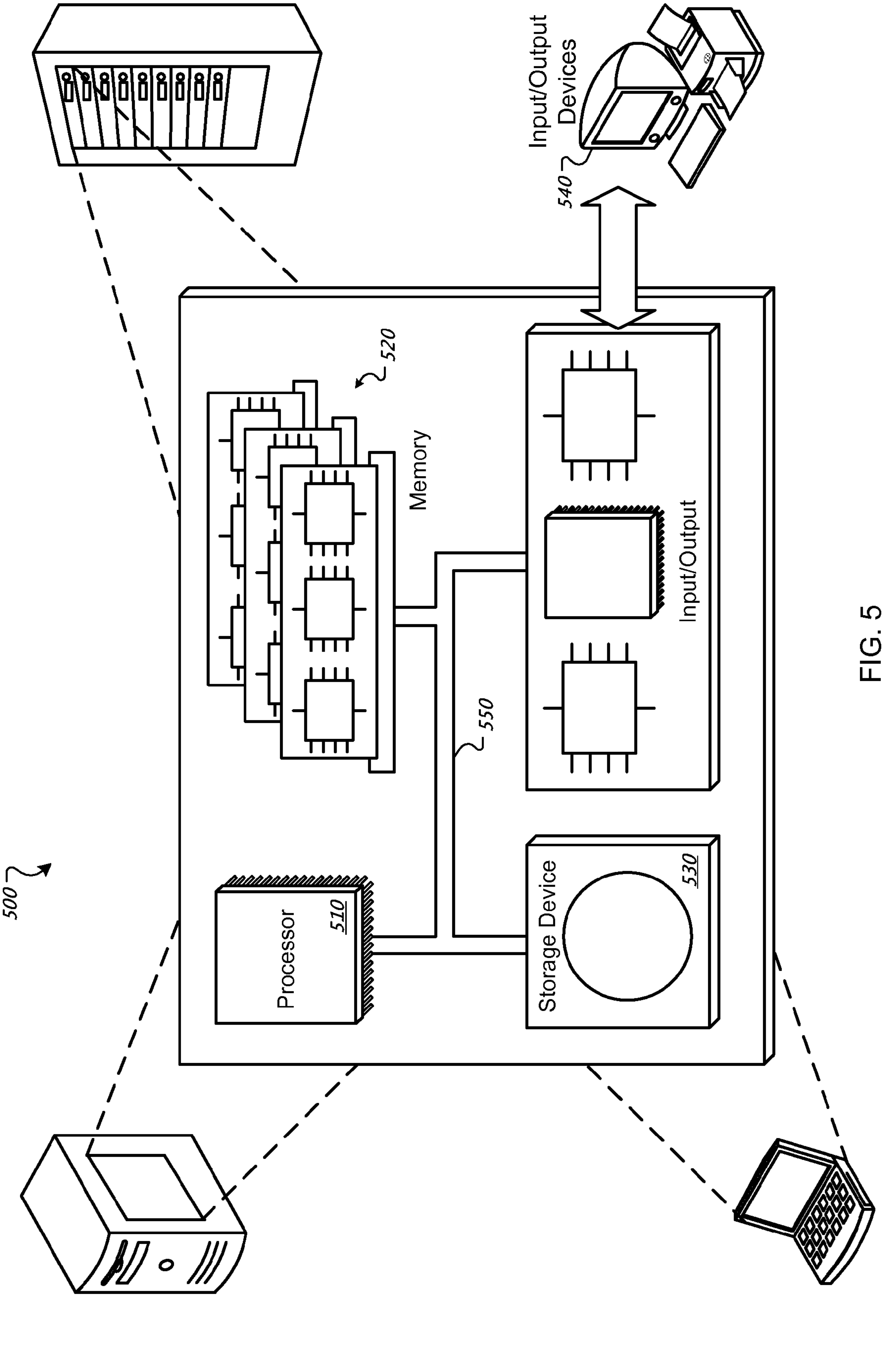
FIG. 5 is a schematic diagram of a generic computer system.

FIG. 5 is a schematic diagram of a generic computer system 500. The system 500 can be used for practicing operations described in association with the techniques described previously (e.g., process 400). The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. Such executed instructions can implement one or more components of a system, for automatically identifying transliteration pairs using anchor text as in FIG. 2, for example. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non volatile that stores information within the system 500. The memory 520 could store the potential transliteration pairs 230 and classification model 240, for example. The storage device 530 is capable of providing persistent storage for the system 500. The storage device 530 may be a floppy disk device, a hard disk device, an optical disk device, or a tape device, or other suitable persistent storage means. The input/output device 540 provides input/output operations for the system 500. In one implementation, the input/output device 540 includes a keyboard and/or pointing device. In another implementation, the input/output device 540 includes a display unit for displaying graphical user interfaces.

The input/output device 540 can provide input/output operations for a system, for automatically identifying transliteration pairs using anchor text as in FIG. 2. The segmentation system can include computer software components to automatically identify transliteration pairs using anchor text. Examples of such software components include an extraction engine to extract anchor text from resources, an alignment engine to align a potential transliteration pair, and a classification engine to classify the potential transliteration pairs. Such software components can be persisted in storage device 530, memory 520 or can be obtained over a network connection, to name a few examples.

Although many of the examples described in this specification illustrate English-Japanese (e.g., Latin-Katakana) transliterations, embodiments of the subject matter and the functional operations described can be implemented for other combinations of writing systems and languages. For example, transliteration pairs can be extracted from English (e.g., Latin characters) and Korean (e.g., Hangul characters) anchor text. As another example, transliteration pairs can be extracted from Hindi (e.g., Devanāgarī characters) and Russian (e.g., Cyrillic characters) anchor text.

In addition, in some implementations, other types (e.g., samples) of text can be used to train the classification model. For example, phonetic variants of a word in a single writing system can be used to train the classification model. As another example, spelling variants of a word in a single writing system can be used to train the classification model. Other implementations are possible.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a device with spoken language input, to name just a few. A smart phone is an example of a device with spoken language input, which can accept voice input (e.g., a user query spoken into a microphone on the device).

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

receiving a plurality of resources, the plurality of resources including a plurality of anchor text, wherein anchor text found in a specific resource of the plurality of resources links to a different resource identified by a uniform resource locator of the different resource;

determining one or more potential transliterations from the plurality of anchor text;

sorting the one or more potential transliterations, based on likelihoods of the one or more potential transliterations co-occurring with text that identifies a same resource or location;

identifying one or more potential transliteration pairs from the one or more potential transliterations, wherein each potential transliteration pair includes a first anchor text in a first writing system and a second anchor text in a second writing system, the second anchor text and the first anchor text linking to a same resource;

for each potential transliteration pair, comparing the first anchor text and the second anchor text; and first classifying the potential transliteration pair as being a transliteration pair or not being a transliteration pair, based on the comparison;

first sorting the first classified potential transliteration pairs, based on likelihoods of the first classified potential transliteration pairs being transliteration pairs, to produce first sorted potential transliteration pairs;

identifying a subset of the first sorted potential transliteration pairs, the subset including potential transliteration pairs classified as being transliteration pairs and potential transliteration pairs classified as not being transliteration pairs;

for each potential transliteration pair in the subset, aligning the first anchor text and the second anchor text; and extracting one or more edits from the alignment;

generating a classification model, based on the one or more edits and the subset; and second classifying each of the first classified potential transliteration pairs as being a transliteration pair or not being a transliteration pair, using the classification model.

2. The method of claim 1, where comparing the first anchor text and the second anchor text includes:

determining a first edit distance between the first anchor text and the second anchor text; and comparing the first edit distance to a first threshold value;

wherein the aligning is based on minimizing the first edit distance.

3. The method of claim 2, where the first threshold value is the lesser of a length of the first anchor text and a length of the second anchor text.

4. The method of claim 3, where the potential transliteration pair is first classified as not being a transliteration pair when the first edit distance is greater than the first threshold value, and the potential transliteration pair is first classified as being a transliteration pair when the first edit distance is less than the first threshold value.

5. The method of claim 1, where generating the classification model includes:

associating each of the one or more edits to a feature; and generating a feature weight for each feature.

6. The method of claim 5, where the second classifying includes:

for each of the first classified potential transliteration pairs, comparing the first classified potential transliteration pair to the one or more features in the classification model;

determining one or more feature weights, based on the comparison; and summing the one or more feature weights to produce a classification score.

7. The method of claim 6, further comprising:

for the one or more edits associated with the first writing system, second sorting the second classified potential transliteration pairs, based on likelihoods of the second classified potential transliteration pairs being transliteration pairs; and for each second sorted potential transliteration pair, reclassifying the second sorted potential transliteration pair as not being a transliteration pair when its corresponding classification score indicates that the second sorted potential transliteration pair is not a transliteration pair;

reclassifying the second sorted potential transliteration pair as a best potential transliteration pair when the second sorted potential transliteration pair has the highest likelihood of being a transliteration pair and its corresponding classification score indicates that the second sorted potential transliteration pair is a transliteration pair;

determining a second edit distance between the second sorted potential transliteration pair and the best potential transliteration pair;

reclassifying the second sorted potential transliteration pair as being a transliteration pair when its second edit distance is less than a second threshold value and its corresponding classification score indicates that the second sorted potential transliteration pair is a transliteration pair; and reclassifying the second sorted potential transliteration pair as not being a transliteration pair when its second edit distance is greater than the second threshold value.

8. The method of claim 7, further comprising:

for the one or more edits associated with the second writing system, third sorting the reclassified potential transliteration pairs, based on likelihoods of the reclassified potential transliteration pairs being transliteration pairs; and for each third sorted potential transliteration pair classified as being a transliteration pair, reclassifying the third sorted potential transliteration pair as not being a transliteration pair when its corresponding classification score indicates that the third sorted potential transliteration pair is not a transliteration pair;

reclassifying the third sorted potential transliteration pair as a best potential transliteration pair when the third sorted potential transliteration pair has the highest likelihood of being a transliteration pair and its corresponding classification score indicates that the third sorted potential transliteration pair is a transliteration pair;

determining a third edit distance between the third sorted potential transliteration pair and the best potential transliteration pair;

reclassifying the third sorted potential transliteration pair as being a transliteration pair when its third edit distance is less than a third threshold value and its corresponding classification score indicates that the third sorted potential transliteration pair is a transliteration pair; and reclassifying the third sorted potential transliteration pair as not being a transliteration pair when its third edit distance is greater than the third threshold value.

9. The method of claim 1, where the classification model uses a support vector machine (SVM).

10. The method of claim 1, where the likelihoods are calculated using log likelihood ratios.

11. A method comprising:

receiving a plurality of resources, the plurality of resources including a plurality of anchor text, wherein anchor text found in a specific resource of the plurality of resources links to a different resource identified by a uniform resource locator of the different resource;

determining one or more potential transliterations from the plurality of anchor text;

identifying one or more potential transliteration pairs from the one or more potential transliterations, wherein each potential transliteration pair includes a first anchor text in a first writing system and a second anchor text in a second writing system, the second anchor text and the first anchor text linking to a same resource;

for each potential transliteration pair, classifying the potential transliteration pair as being a transliteration pair or not being a transliteration pair;

aligning the first anchor text with the second anchor text; and extracting one or more edits from the alignment; and generating a classification model, based on the one or more edits and a subset of the classified potential transliteration pairs.

12. The method of claim 11, further comprising identifying transliteration pairs from the potential transliteration pairs, using the classification model.

13. The method of claim 11, wherein the one or more potential transliteration pairs are identified from the one or more potential transliterations, based on likelihoods of the one or more potential transliterations co-occurring with text that identifies a same resource or location.

14. The method of claim 11, wherein the classifying includes:

determining a first edit distance between the first anchor text and the second anchor text;

comparing the first edit distance to a first threshold value; and classifying the potential transliteration pair as being a transliteration pair or not being a transliteration pair, based on the comparison;

wherein the aligning is based on minimizing the first edit distance.

15. The method of claim 14, where the first threshold value is the lesser of a length of the first anchor text and a length of the second anchor text.

16. The method of claim 15, further comprising:

reclassifying the potential transliteration pairs based on refinement rules and the one or more edits in the first writing system.

17. The method of claim 16, further comprising:

reclassifying the potential transliteration pairs classified as being a transliteration pair based on the refinement rules and the one or more edits in the second writing system.

18. The method of claim 11, further comprising:

sorting the classified potential transliteration pairs based on likelihoods of the classified potential transliteration pairs being transliteration pairs.

19. The method of claim 18, where the subset includes potential transliteration pairs classified as being a transliteration pair and potential transliteration pairs classified as not being a transliteration pair.

20. The method of claim 11, where the classification model uses a support vector machine (SVM).

21. A computer program product, encoded on a computer readable storage medium, operable to cause one or more processors to perform operations comprising:

receiving a plurality of resources, the plurality of resources including a plurality of anchor text, wherein anchor found in a specific resource of the plurality of resources links to a different resource identified by a uniform resource locator of the different resource;

determining one or more potential transliterations from the plurality of anchor text;

identifying one or more potential transliteration pairs from the one or more potential transliterations, wherein each potential transliteration pair includes a first anchor text in a first writing system and a second anchor text in a second writing system, the second anchor text and the first anchor text linking to a same resource;

for each potential transliteration pair, classifying the potential transliteration pair as being a transliteration pair or not being a transliteration pair;

aligning the first anchor text with the second anchor text; and extracting one or more edits from the alignment; and generating a classification model, based on the one or more edits and a subset of the classified potential transliteration pairs.

22. A system comprising:

a machine readable storage device including a program product; and one or more computers operable to execute the program product and perform operations comprising:

receiving a plurality of resources, the plurality of resources including a plurality of anchor text, wherein anchor text found in a specific resource of the plurality of resources links to a different resource identified by a uniform resource locator of the different resource;

determining one or more potential transliterations from the plurality of anchor text;

identifying one or more potential transliteration pairs from the one or more potential transliterations, wherein each potential transliteration pair includes a first anchor text in a first writing system and a second anchor text in a second writing system, the second anchor text and the first anchor text linking to a same resource;

for each potential transliteration pair, classifying the potential transliteration pair as being a transliteration pair or not being a transliteration pair;

aligning the first anchor text with the second anchor text; and extracting one or more edits from the alignment; and generating a classification model, based on the one or more edits and a subset of the classified potential transliteration pairs.

* * * * *